(12) United States Patent
Ono et al.

(10) Patent No.: US 11,065,829 B2
(45) Date of Patent: Jul. 20, 2021

(54) FIBER-REINFORCED RESIN INTERMEDIATE MATERIAL, FIBER-REINFORCED RESIN MOLDED ARTICLE, AND METHOD FOR PRODUCING FIBER-REINFORCED RESIN INTERMEDIATE MATERIAL

(71) Applicant: THE JAPAN STEEL WORKS, LTD., Tokyo (JP)

(72) Inventors: Akio Ono, Hiroshima (JP); Hiroshi Ito, Hiroshima (JP); Tsukasa Shiroganeya, Hiroshima (JP); Takuya Niyama, Hiroshima (JP); Takuya Iwamoto, Hiroshima (JP); Shigeki Inoue, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 102 days.

(21) Appl. No.: 16/093,523

(22) PCT Filed: Apr. 14, 2017

(86) PCT No.: PCT/JP2017/015359
§ 371 (c)(1),
(2) Date: Oct. 12, 2018

(87) PCT Pub. No.: WO2017/179721
PCT Pub. Date: Oct. 19, 2017

(65) Prior Publication Data
US 2019/0160762 A1    May 30, 2019

(30) Foreign Application Priority Data
Apr. 15, 2016 (JP) .............................. JP2016-082520

(51) Int. Cl.
*B32B 7/02* (2019.01)
*B29C 70/46* (2006.01)
(Continued)

(52) U.S. Cl.
CPC .......... *B29C 70/465* (2013.01); *B29B 15/105* (2013.01); *B29C 43/02* (2013.01);
(Continued)

(58) Field of Classification Search
CPC ..... B29B 15/105; B29C 43/02; B29C 70/465; B29K 2101/10; B29K 2105/251;
(Continued)

(56) References Cited

U.S. PATENT DOCUMENTS 5,094,883 A   3/1992  Muzzy et al.
5,934,809 A   8/1999  Marbler
(Continued)

FOREIGN PATENT DOCUMENTS

CN   1347364 A   5/2002
CN   107073754 A   8/2017
(Continued)

OTHER PUBLICATIONS

Hanyu, JP 2014-172336 A, September (Year: 2014).*
(Continued)

*Primary Examiner* — Lawrence D Ferguson
(74) *Attorney, Agent, or Firm* — Sughrue Mion, PLLC

(57) ABSTRACT

The fiber-reinforced resin intermediate material according to the present invention is formed by attaching a resin powder to an outer surface of a reinforcing fiber substrate formed of reinforcing fibers and heating it to melt the resin powder to the outer surface of the reinforcing fiber substrate so as to have an uneven shape derived from the resin powder and also have an opened void space.

19 Claims, 4 Drawing Sheets

(51) Int. Cl.
  *B29C 43/02* (2006.01)
  *C08J 5/04* (2006.01)
  *B29B 15/10* (2006.01)
  *C08J 5/24* (2006.01)
  *B29K 101/10* (2006.01)
  *B29K 105/00* (2006.01)
  *B29K 307/04* (2006.01)

(52) U.S. Cl.
  CPC .............. *C08J 5/04* (2013.01); *C08J 5/042* (2013.01); *C08J 5/24* (2013.01); *B29K 2101/10* (2013.01); *B29K 2105/251* (2013.01); *B29K 2307/04* (2013.01); *C08J 2377/02* (2013.01)

(58) Field of Classification Search
  CPC ..... B29K 2307/04; C08J 2377/02; C08J 5/04; C08J 5/042; C08J 5/24
  See application file for complete search history.

(56) References Cited

U.S. PATENT DOCUMENTS

| | | | |
|---|---|---|---|
| 6,054,177 | A | 4/2000 | Endoh et al. |
| 6,139,956 | A | 10/2000 | Endoh et al. |
| 6,173,554 | B1 | 1/2001 | Marbler |
| 2002/0034624 | A1 | 3/2002 | Harpell et al. |
| 2002/0037391 | A1 | 3/2002 | Harpell et al. |
| 2003/0127186 | A1 | 7/2003 | Tominaga et al. |
| 2004/0170554 | A1 | 9/2004 | Wadahara et al. |
| 2009/0029612 | A1 | 1/2009 | Tsuji et al. |
| 2011/0079348 | A1 | 4/2011 | Tsuji et al. |
| 2017/0241074 | A1 | 8/2017 | Ono et al. |
| 2019/0284755 | A1 | 9/2019 | Ono et al. |

FOREIGN PATENT DOCUMENTS

| | | |
|---|---|---|
| EP | 1 408 152 A1 | 4/2004 |
| EP | 3 208 062 A1 | 8/2017 |
| JP | 11-240967 A | 9/1999 |
| JP | 2001-138438 A | 5/2001 |
| JP | 2003-165851 A | 6/2003 |
| JP | 3681127 B2 | 8/2005 |
| JP | 2010-131846 A | 6/2010 |
| JP | 2010-253938 A | 11/2010 |
| JP | 2011-207930 A | 10/2011 |
| JP | 2013-180406 A | 9/2013 |
| JP | 2014-019141 A | 2/2014 |
| JP | 2014-172336 A | 9/2014 |
| WO | 00/48821 A1 | 8/2000 |
| WO | 2007/013204 A1 | 2/2007 |

OTHER PUBLICATIONS

Office Action dated Jul. 4, 2017 by the Japanese patent Office in counterpart Japanese Patent Application No. 2016-082520.
Office Action dated Nov. 9, 2017 by the Japanese patent Office in counterpart Japanese Patent Application No. 2016-082520.
Office Action dated May 11, 2018 by the Japanese patent Office in counterpart Japanese Patent Application No. 2016-082520.
Goichi Ben, "Molding Method using Thermoplastic Resin Powder and Characteristic Properties Thereof", Molding Method of Continuous Fiber FRTP and Characteristics Thereof (from Carbon Glass to Natural Fibers), Nikkan Kogyo Shimbun, Ltd., Mar. 30, 2015, pp. 139-168. (60 pages total).
Submission of Publication dated Sep. 28, 2018 by the Japanese Patent Office in counterpart Japanese Patent Application No. 2016-082520.
Communication dated Dec. 17, 2018, issued by the Japanese Patent Office in counterpart Japanese Patent Application No. 2016-082520.
Search Report dated Jul. 11, 2017, issued by the International Searching Authority in counterpart International Patent Application No. PCT/JP2017/015359 (PCT/ISA/210).
Written Opinion dated Jul. 11, 2017, issued by the International Searching Authority in counterpart International Patent Application No. PCT/JP2017/015359 (PCT/ISA/237).
Communication dated Nov. 8, 2019 issued by the European Intellectual Property Office in counterpart European Application No. 17782534.6.
Communication dated Mar. 10, 2020, issued by the Korean Intellectual Property Office in counterpart Korean Application No. 10-2018-7029458.
Communication dated Sep. 2, 2020, issued by the State Intellectual Property Office of P.R. China in counterpart Chinese Application No. 201780023420.3.

* cited by examiner

[FIG. 1]
(a)
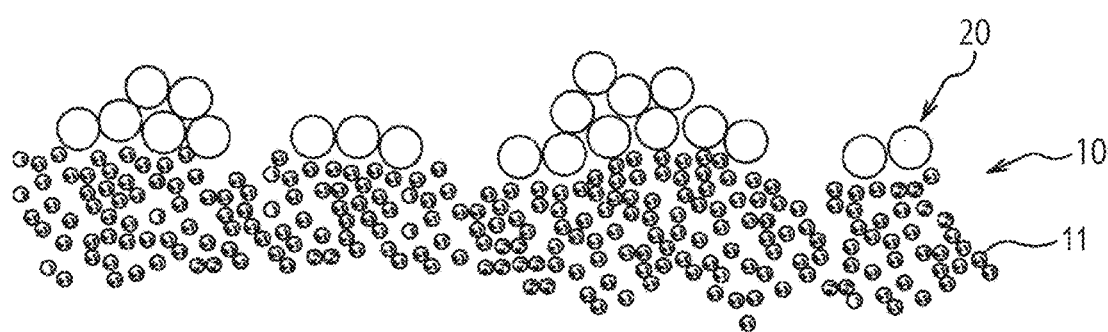
(b)
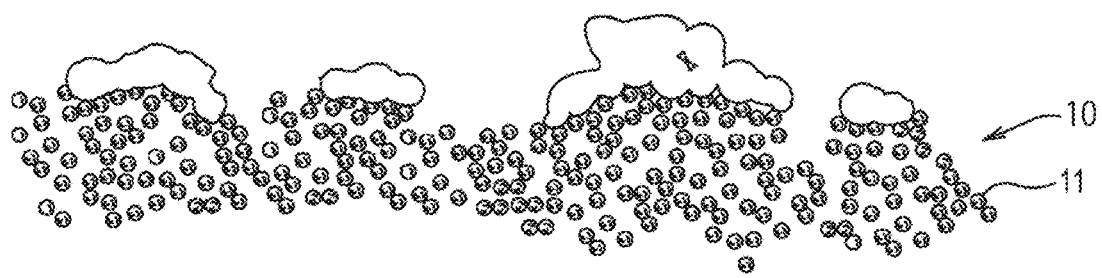

[FIG. 2]
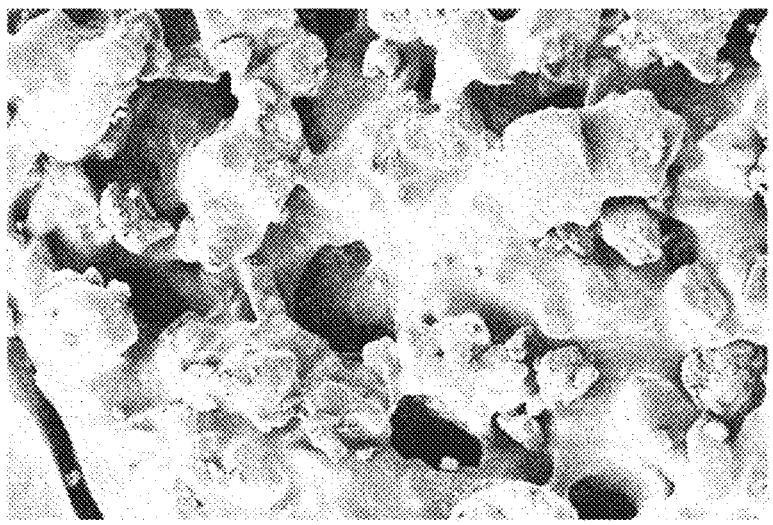
[FIG. 3]
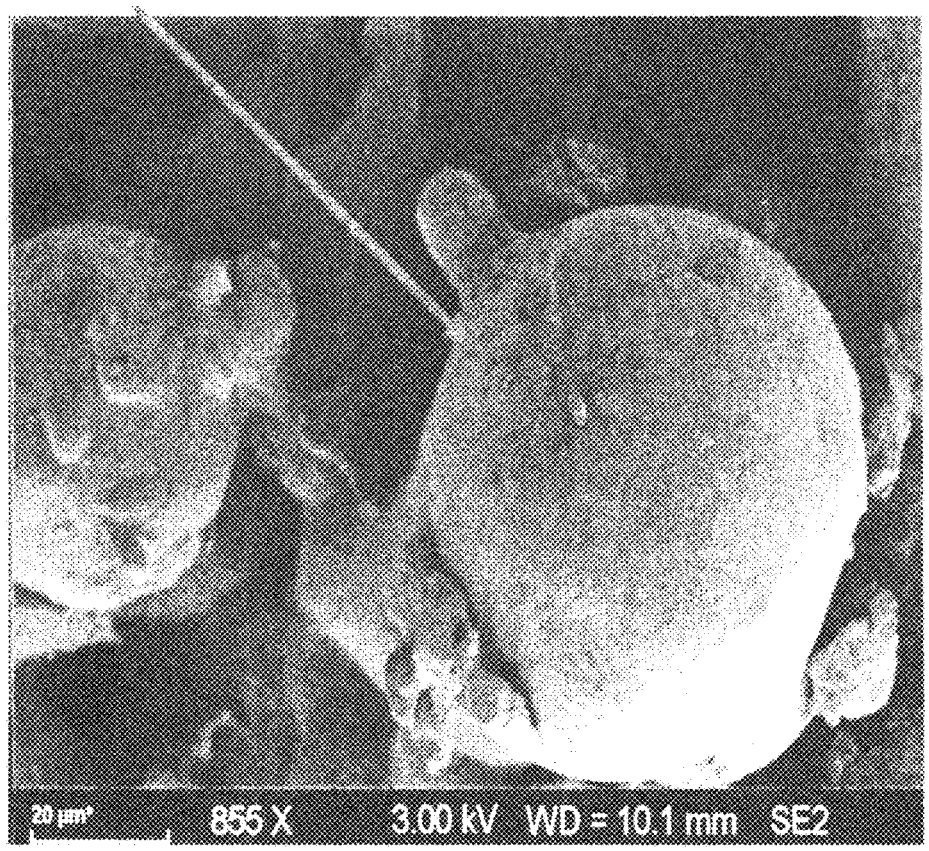

[FIG. 4]
(a)
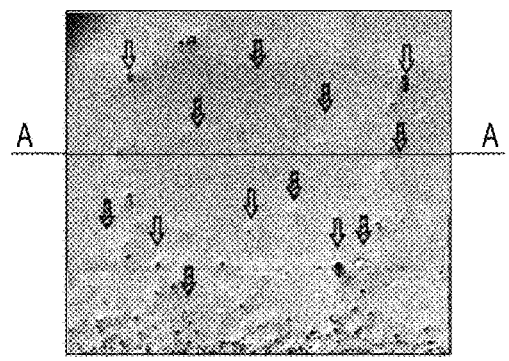
(b)
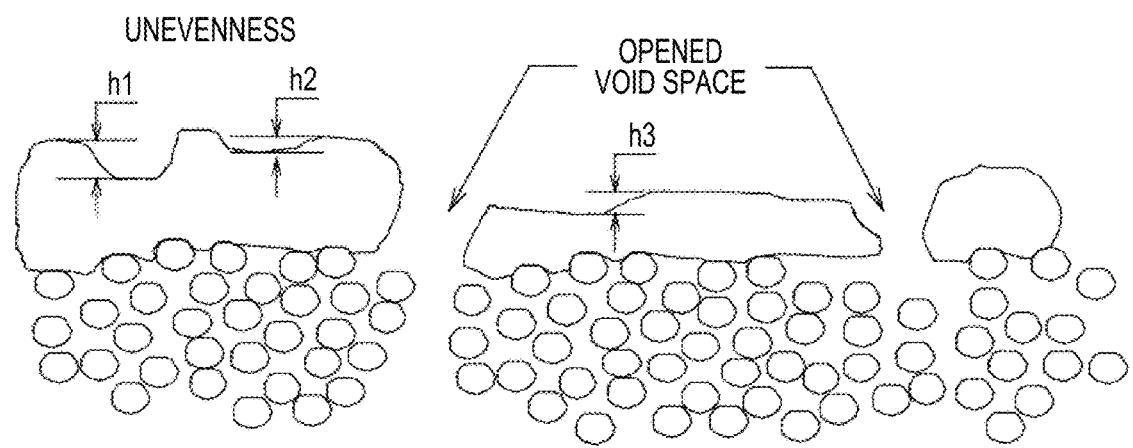

[FIG. 5]
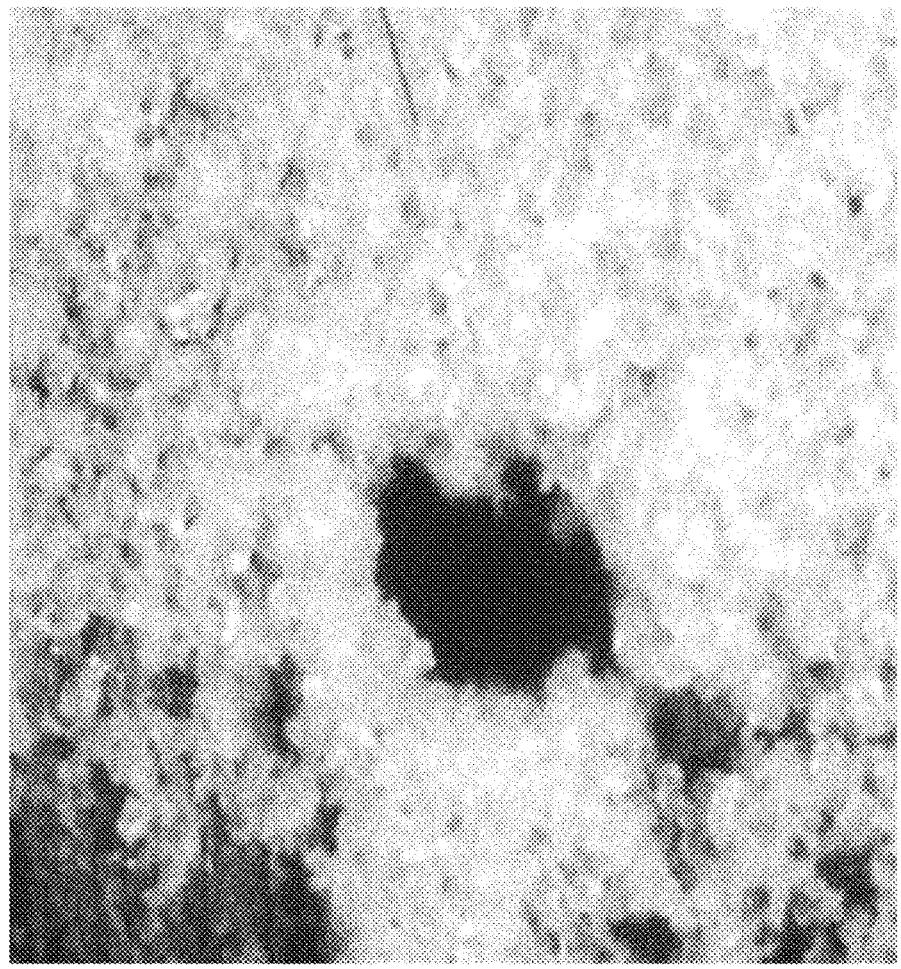

FIBER-REINFORCED RESIN INTERMEDIATE MATERIAL, FIBER-REINFORCED RESIN MOLDED ARTICLE, AND METHOD FOR PRODUCING FIBER-REINFORCED RESIN INTERMEDIATE MATERIAL

TECHNICAL FIELD

The present invention relates to a fiber-reinforced resin intermediate material which is heated, pressurized, and cooled to be processed into a fiber-reinforced resin molded body, the fiber-reinforced resin molded body, and a method for manufacturing a fiber-reinforced resin intermediate material.

BACKGROUND ART

In recent years, for the purpose of weight saving and an improvement in mechanical strength, fiber reinforced composite resin obtained by impregnating reinforcing fiber substrates such as carbon fiber, glass fiber, and natural fibers with a resin have been widely utilized in a variety of fields and uses and their application to aircraft components and automobile components has been in progress. Such fiber-reinforced resin molded bodies are required to have less defects such as voids, the impregnation of the reinforcing fiber substrate with the resin being performed at a predetermined fiber volume content, so as to exhibit predetermined properties such as mechanical strength. Also, it is required to have such shaping ability that molding is possible even if the shape is complex one. For such requirement, there have been proposed a variety of fiber-reinforced resin intermediate materials in which a reinforcing fiber substrate is impregnated with a resin and which is heated, pressurized, and cooled in a laminated state to be processed into a fiber-reinforced resin molded body.

PTL 1 proposes a fiber-reinforced thermoplastic resin sheet wherein by overlaying a thermoplastic resin non-woven fabric on a reinforcing fiber sheet in which a plurality of reinforcing fiber bundles are aligned in one direction and performing pressurization while heating, the thermoplastic resin non-woven fabric is melted to impregnate the reinforcing fiber bundles with a thermoplastic resin. It is said that the fiber-reinforced thermoplastic resin sheet can be brought into a semi-impregnated state that void space parts at which the reinforcing fiber bundle is not impregnated with the thermoplastic resin are present. Therefore, a time required for manufacturing the fiber-reinforced thermoplastic resin sheet can be shortened and a fiber-reinforced thermoplastic resin sheet having flexibility is obtained. Moreover, it is said that the non-impregnated parts can be reduced since the reinforcing fiber sheet can be thinned, and thus, by pressurizing it while heating, it is possible to form a sufficiently impregnated final molded article.

PTL 2 proposes a prepreg which comprises a fiber substrate formed in a layered shape and a resin layer provided on at least one surface side thereof and composed of a resin composition and wherein a void space layer not impregnated with the resin composition is formed in at least a part of the fiber substrate. It is said that the void space layer of the prepreg may have a form that a part of the fiber substrate is exposed and is preferably formed so as to communicate from one end of the prepreg to another end thereof. Moreover, it is said to be sufficient that a void space layer communicating from one end to the other end is present at an intermediate part thereof even when resin layers are present on both surfaces of the fiber substrate. In the case of laminating such a prepreg, since the resin is supported with the fiber substrate, it is said that the fiber substrate can be prevented from waving and air is easily released at the time of laminating the prepreg and air bubbles are less prone to occur. As the above resin composition, a thermosetting resins such as a phenol novolak resin and a cresol novolak resin are mentioned and a thermoplastic resin such as a phenoxy resin or a polyimide resin may be used in combination.

PTL 3 proposes a method for manufacturing a molding material, which comprises adding a solution of a predetermined amount of a binder resin dissolved in a solvent in which a thermoplastic resin powder is insoluble or hardly soluble to a continuous fiber assembly for reinforcement to which the thermoplastic resin powder is attached between fibers and drying the solution in a temperature range that is not higher than the melting point or flow starting temperature of the thermoplastic resin powder. When the drying temperature is too high, it is said that, since the powdery thermoplastic resin is melted to form a matrix layer, a drape property is lost and an objective molding material is not obtained. The manufacturing method belongs to a powder method, is excellent in the drape property, and can use various kinds of thermoplastic resins and, since the binder resin combines fibers of the continuous fiber assembly for reinforcement each other, the fiber and the thermoplastic resin powder, and the thermoplastic resin powders each other in a pinpoint manner, drop-out of the thermoplastic resin powder is prevented and fiber-opening at the time of handling the molding material can be prevented, so that the method is said to be excellent in handling ability.

CITATION LIST

Patent Documents

PTL 1: JP-A-2003-165851
PTL 2: JP-A-2013-180406
PTL 3: Japanese Patent No. 3681127

SUMMARY OF INVENTION

Technical Problem

As mentioned above, shaping ability is required for a fiber-reinforced resin intermediate material. It is intended to improve the shaping ability of the fiber-reinforced resin intermediate material by making a fiber-reinforced thermoplastic resin sheet a semi-impregnated state in PTL 1, providing a void space layer not impregnated in a prepreg in PTL 2, or combining a continuous fiber for reinforcement and a thermoplastic resin powder in a pinpoint manner in PTL 3. Since an additional step such as a drying step as in the molding method described in PTL 3 is not required, the molding method of the fiber-reinforced thermoplastic resin sheet described in PTL 1 and the molding method of the prepreg described in PTL 2 are preferable.

On the other hand, it is important how air contained in the inside of the reinforcing fiber substrate is discharged at the time of molding the fiber-reinforced resin intermediate material, and a fiber-reinforced resin molded body having no defects such as voids can be molded by sufficiently discharging air contained in the fiber-reinforced resin intermediate material. In the fiber-reinforced thermoplastic resin sheet described in PTL 1, at the time of heating and pressurizing a fabric composed of a thermoplastic resin fiber overlaid on a fiber-reinforced sheet, since the melted thermoplastic resin layer is pressurized and compressed to cover a surface of the reinforcing fiber sheet in a film shape, there are problems that air in the reinforcing fiber sheet is difficult to be released, and thus voids are easily formed. Contrarily, in the prepreg described in PTL 2, since the void space layer for discharging air inside the prepreg is provided, the prepreg is excellent in that the generation of defects such as voids can be prevented. However, the prepreg has problems that, since migration distance of air is long, the air is not easily released and also a resin composition composed of a thermoplastic resin alone cannot be used. In the molding material described in PTL 3, it is unclear that what kind of form of the thermoplastic resin is attached to the continuous fiber assembly for reinforcement and also there is not described how the air contained in the continuous fiber assembly for reinforcement is discharged.

In consideration of such conventional problems, an object of the present invention is to provide a fiber-reinforced resin intermediate material that can be molded into a fiber-reinforced resin molded body which is excellent in shaping ability and handling ability and in which defects such as voids are difficult to generate, the material being formed by attaching a thermosetting resin or a thermoplastic resin that has high melt viscosity and does not easily realize impregnation therewith so as to provide a void space for discharging air contained in the reinforcing fiber substrate; the fiber-reinforced resin molded body; and a method for manufacturing the fiber-reinforced resin intermediate material.

Solution to Problem

The present inventors have conducted various investigations on molding methods and test conditions capable of securing a void space for discharging air contained in a reinforcing fiber substrate to the outer surface and also attaching a necessary resin powder to the reinforcing fiber substrate at the time of attaching the resin powder to the reinforcing fiber substrate by powder method, and have accomplished the present invention.

A fiber-reinforced resin intermediate material according to the present invention is formed by attaching a resin powder to an outer surface of a reinforcing fiber substrate, which is formed of reinforcing fibers, and heating it to melt the resin powder to the outer surface of the reinforcing fiber substrate so as to have an uneven shape derived from the resin powder and to have an opened void space.

In the above invention, the resin powder to be attached to the reinforcing fiber substrate may have an average particle size of 1 to 500 μm.

Further, an uneven shape part where the resin powder is melted to the reinforcing fiber substrate may have an uneven that is ½ or more as large as an average particle size of the resin powder.

As for the reinforcing fiber substrate, the reinforcing fiber may be composed of carbon fiber and fiber areal weight is 20 to 1,000 g/m².

Further, a fiber-reinforced resin intermediate material according to the present invention may be formed by attaching a resin powder to an outer surface of a reinforcing fiber substrate formed of carbon fibers and heating it to fuse the resin powder so as to have an opened void space on the outer surface of the reinforcing fiber substrate, wherein the minimum radius of curvature of the fiber-reinforced resin intermediate material is within 20 times as large as the thickness thereof. Here, the minimum radius of curvature is a radius of curvature at the time of fracture/breakage when the fiber-reinforced resin intermediate material is bent at room temperature.

Further, a fiber-reinforced resin intermediate material according to the present invention may be formed by attaching a resin powder to an outer surface of a reinforcing fiber substrate formed of reinforcing fibers and heating it to melt the resin powder to the outer surface of the reinforcing fiber substrate. Here, the melting to the outer surface of the reinforcing fiber substrate means a state that the melted resin powder almost remains on the outer surface and is fixed thereto.

By laminating, heating, and pressurizing the above fiber-reinforced resin intermediate material, a fiber-reinforced resin molded body having less defects such as voids may be molded. The fiber-reinforced resin molded body, in which the fiber volume content is 15 to 70% and the void ratio is 1.5% or less, may be molded.

The method for manufacturing a fiber-reinforced resin intermediate material according to the present invention is a method for manufacturing a fiber-reinforced resin intermediate material formed by fusing a resin powder so as to have a void space opened on an outer surface of a reinforcing fiber substrate, wherein a resin powder having a predetermined average particle size is attached to the reinforcing fiber substrate so that the fiber volume content of the reinforcing fiber substrate becomes a predetermined value, based on the outer diameter of the reinforcing fiber that forms the reinforcing fiber substrate and the bulk density of the reinforcing fiber substrate.

Advantageous Effects of Invention

In the fiber-reinforced resin intermediate material according to the present invention, a resin powder is melted to an outer surface of a reinforcing fiber substrate so as to have an uneven shape derived from the resin powder and also have an opened void space. Therefore, the present fiber-reinforced resin intermediate material has flexibility since the fibers forming the reinforcing fiber substrate are not bound with a melted resin and in a movable state. Moreover, the reinforcing fiber substrate has the void space opened on the outer surface and the whole surface of the reinforcing fiber substrate is not covered with a melted resin, it is highly flexible as compared with one where a film-like resin is attached to the reinforcing fiber substrate.

Furthermore, the fiber-reinforced resin intermediate material according to the present invention is rich in impregnating ability since the resin powder is opened to expose the reinforcing fiber substrate to the outer surface and sufficient void space is present in the inside thereof. In addition, by laminating the fiber-reinforced resin intermediate material excellent in shaping ability and impregnating ability simultaneously and performing heating and pressurization, there can be molded a fiber-reinforced resin molded body having a desired fiber volume content even in a complex shape and having less defects such as voids.

BRIEF DESCRIPTION OF THE DRAWINGS

FIG. 1(a) is a drawing showing a reinforcing fiber substrate to which a resin powder is attached, and FIG. 1(b) is a drawing schematically showing a microstructure of the reinforcing fiber substrate to which the resin powder is melted.

FIG. 2 is an optical microscope photograph showing a surface of the reinforcing fiber substrate to which the resin powder is melted.

FIG. 3 is a scanning electron microscope (SEM) photograph showing a surface of the reinforcing fiber substrate to which the resin powder is melted.

FIG. 4(a) and FIG. 4(b) are explanatory drawings with regard to an uneven form derived from the resin powder of the fiber-reinforced resin intermediate material and a form having an opened void space.

FIG. 5 is an optical microscope photograph showing a state that the resin powder of Examples is attached to an outer surface of the reinforcing fiber substrate.

DESCRIPTION OF EMBODIMENTS

The following description will be given for modes for carrying out the present invention based on Drawings. The fiber-reinforced resin intermediate material according to the present invention is formed by attaching a resin powder to an outer surface of a reinforcing fiber substrate formed of reinforcing fibers and heating it to melt the resin powder to the outer surface of the reinforcing fiber substrate so as to have an uneven shape derived from the resin powder and also have an opened void space. That is, the present fiber-reinforced resin intermediate material is formed by melting the resin powder to the reinforcing fiber substrate to such a degree that an uneven form derived from the shape, size, or attached state of the powder still remains. Therefore, the resin powder is melted to the outer surface of the reinforcing fiber substrate by heating alone without pressurization. Since the resin powder has large specific surface area, it is easily melted by heating and the melted resin powders are prone to combine with each other by surface tension thereof, so that the resin powder can be melted to the reinforcing fiber substrate so as to have an uneven outer surface derived from the powder. Since such a fiber-reinforced resin intermediate material has void space inside the reinforcing fiber substrate and has a void space opened on the outer surface of the reinforcing fiber substrate, the material has flexibility, is easy to handle, is excellent in shaping ability, and also is excellent in impregnating ability. Moreover, in the step of heating and pressurizing the fiber-reinforced resin intermediate material to mold the fiber-reinforced resin molded body, air contained in the fiber-reinforced resin intermediate material can be easily discharged to the outside through the above void space.

The above fiber-reinforced resin intermediate material can be obtained, as will be explained below, by attaching the resin powder to the reinforcing fiber substrate and subsequently heating and melting the attached resin powder to an outer surface of the reinforcing fiber substrate to such a degree that an uneven form derived from the shape, size, or attached state of the formed resin powder does not disappear. That is, when the resin powder is completely melted to become in a fluidizing state, the uneven outer surface derived from the resin powder disappears and it becomes in a state of being covered with a film-like melted resin, so that it is important to stop the heating/melting at a stage before reaching such a state.

For the attachment of the resin powder to the reinforcing fiber substrate, it is preferable to use an electrostatic adhesion method. For the electrostatic adhesion of a resin powder 20, as shown in FIG. 1(a), the resin powder 20 is sprayed to a reinforcing fiber substrate 10 in a state that the resin powder 20 is charged so that the resin powder 20 is attached to an outer surface of the fiber substrate. The electrostatic adhesion is performed in a dry state that a solvent or the like is not used. The resin powder 20 is attached to a surface of the reinforcing fiber substrate 10 in a uniform thickness and in a uniform distribution when macroscopically observed but, when microscopically observed, as shown in FIG. 1(a), the surface of the reinforcing fiber substrate 10 formed of a large number of bundled reinforcing fibers 11 has a part to which the resin powder 20 is attached in one layer or in plural layers or a part to which the resin powder 20 is not attached. The surface of the fiber substrate 10 formed of a large number of reinforcing fibers 11 is in a state that the void space present inside the reinforcing fibers 11 is opened on the outer surface of the reinforcing fiber substrate 10, and the reinforcing fiber substrate 10 has a void space opened on the outer surface. Such a state can be generated by electrostatically attaching the resin powder 20 having a predetermined average particle size to the reinforcing fiber substrate 10 so that the fiber volume content of the reinforcing fiber substrate 10 becomes a predetermined value, for example, a value of 20% to 70% that is a preferable range to be shown later, based on the outer diameter of the reinforcing fibers 11 that form the reinforcing fiber substrate 10 and the bulk density of the reinforcing fiber substrate 10. Incidentally, the attachment of the resin powder 20 to the reinforcing fiber substrate 10 can be also performed by simply spraying the resin powder 20 to the reinforcing fiber substrate 10. Further, in the present invention, the outer surface of the reinforcing fiber substrate 10 means an opened surface of the reinforcing fiber substrate 10.

Next, the reinforcing fiber substrate 10 to which the resin powder 20 has been attached is heated to such a degree that the uneven outer surface derived from the shape, size, or attached state of the resin powder 20 does not disappear. On this occasion, the resin powder 20 is melted and fluidized at a temperature equal to or higher than the sintering point of the resin powder 20 but the resin powder 20 attached to the reinforcing fiber substrate 10 thus heated is in such a state as shown in FIG. 1(b). That is, the resin powder 20 is melted but does not penetrate into the inside of the reinforcing fiber substrate 10 through a space between the reinforcing fibers 11 and almost remains on the outer surface of the reinforcing fiber substrate 10 to which the powder has been attached, so that the reinforcing fiber substrate 10 is in a state that it has the void space opened on the outer surface. FIG. 2 is an optical microscope photograph showing such a state and FIG. 3 is a SEM photograph. According to FIG. 2, on the outer surface of the reinforcing fiber substrate 10, an uneven state derived from the shape, size, or attaching state of the resin powder 20 is observed and also a void space opened on the outer surface is observed. According to FIG. 3, a state that the resin powders are melted and combined with each other is observed. Incidentally, the state that the melted resin powder almost remains on the outer surface of the reinforcing fiber substrate 10 means that the state includes a state that the melted resin powder not only remains on the outer surface of the reinforcing fiber substrate 10 but also the substrate is slightly impregnated therewith from the outer surface, and impregnation depth thereof is not larger than a depth of several fibers of the reinforcing fibers 11 that form the reinforcing fiber substrate 10. For example, in the case of the reinforcing fiber substrate 10 having a thickness of 200 μm in which the reinforcing fiber 11 is composed of carbon fiber having an outer diameter of 7 μm, the state means a state that the impregnation depth is 20 μm or smaller.

FIG. 4 shows another example of the state that the resin powder 20 is melted to an outer surface of the reinforcing fiber substrate 10 so as to have an uneven shape derived from the resin powder 20 and also have an opened void space. The example of FIG. 4 is an example of an advanced state of melting of the resin powder 20 as compared with the example of FIG. 2 or FIG. 3. FIG. 4(a) is a SEM photograph and FIG. 4(b) is a drawing schematically showing the A-A line cross-section part in FIG. 4(a). In FIG. 4(a), the outlined arrow shows an opened void space. The hatched arrow shows a part where the height of unevenness is large. The uneven shape derived from the shape, size, or attached state of the resin powder 20 means not the uneven on the surface of the reinforcing fiber substrate 10 itself but the unevenness derived from the shape, size, or attached state of the resin powder 20 attached to the reinforcing fiber substrate 10 as shown in FIG. 4(b). The unevenness (height of unevenness h1, h2, h3) is preferably ½ or more as large as the average particle size of the resin powder 20.

As the resin powder 20, one having an average particle size of 1 to 500 µm can be used and a resin powder composed of a thermoplastic resin or a resin powder composed of a thermosetting resin can be used. As the thermoplastic resin, there can be used polycarbonate (PC), polysulfone (PSU), polyethersulfone (PES), polyamideimide (PAI), polyetherimide (PEI), polyamide-based resins (PA6, PA11, PA66), polybutylene terephthalate (PBT), polyethylene terephthalate (PET), polyphenylene sulfide (PPS), polyether ether ketone (PEEK), polyether ketone ketone (PEKK), and the like. As the thermosetting resin, there can be used epoxy resins, phenol resins, polyimide resins, polyamideimide resins, melamine resins, and the like.

As the reinforcing fiber substrate 10, there can be used one composed of a filamentary or woven fabric-like reinforcing fiber using the reinforcing fiber 11 or one composed of a discontinuous reinforcing fiber that is two-dimensionally or three-dimensionally randomly oriented. For example, a UD sheet can be used as a filamentary reinforcing fiber substrate and a woven fabric such as plain-weave, twill-weave, or satin-weave one can be used as a woven fabric-form reinforcing fiber substrate. In a case where the reinforcing fiber is carbon fiber, one having a fiber areal weight of 20 g/m² to 1,000 g/m² can be used. In the present invention, the reinforcing fiber substrates having a variety of forms can be used. Incidentally, in the present invention, the term "orientation" is used in wide meanings including from so-called orientation of fibers to arrangement aligned to a predetermined form.

The reinforcing fiber 11 is preferably carbon fiber and, in addition, there can be used glass fiber, natural fiber, aramid fiber, boron fiber, polyethylene fiber, and reinforced polypropylene fiber.

In the invention, as the resin powder 20, it is preferable to use a powder having an average particle size ⅕ to 30 times as large as the outer diameter of the reinforcing fiber 11. The resin powder 20 having such an average particle size has an advantage that it is easily electrostatically attached to the reinforcing fiber substrate 10. Incidentally, the average particle size of the resin powder 20 is appropriately selected according to kind, density, and viscosity of the resin to be used, outer shape of the fiber, and final fiber volume content.

The fiber volume content Vf of reinforcing fiber of the present fiber-reinforced resin intermediate material is 20% to 70%, preferably 30% to 65%, and more preferably 35% to 60%. The higher the fiber volume content Vf is, the more the physical properties increase. However, when the content is too high, impregnation becomes difficult. On the other hand, when the fiber volume content Vf is low, sufficient physical properties are not obtained. Incidentally, when the fiber volume content Vf decreases, it is necessary to increase the amount of the resin to be attached to the surface and, for manufacturing the fiber-reinforced resin intermediate material having a void space opened on the outer surface, it is necessary to decrease the fiber areal weight of the substrate. The fiber volume content Vf can be, for example, determined in accordance with JIS K 7075.

In the above, the fiber-reinforced resin intermediate material according to the present invention has been explained. The present fiber-reinforced resin intermediate material can be laminated in a predetermined mold, and heated and pressurized to form a fiber-reinforced resin molded body having a predetermined shape. By using the fiber-reinforced resin intermediate material, it is possible to mold it into a fiber-reinforced resin molded body having a fiber volume content of 15 to 70% and a void ratio of 1.5% or less, further a void ratio of 0.5% or less. In the present invention, the fiber-reinforced resin intermediate material is in a state that the resin is melted in a state that it has the void space opened on the outer surface and the reinforcing fiber substrate is not compressed. Therefore, at the time when the resin melted to the reinforcing fiber substrate is heated and melted and is pressurized to impregnate the reinforcing fiber substrate with the melted resin, a pore for releasing air present inside the reinforcing fiber substrate is secured and also the melted resin is prone to pass through the reinforcing fiber substrate, so that impregnating ability is improved and a fiber-reinforced resin molded body having a fiber volume content higher than conventional ones can be obtained. Incidentally, the fiber volume content Vf can be, for example, determined according to JIS K 7075.

The above-described fiber-reinforced resin intermediate material can be formed as follows. That is, based on the outer diameter of the reinforcing fiber that forms the reinforcing fiber substrate and the bulk density of the reinforcing fiber substrate, by electrostatically attaching a resin powder having a predetermined average particle size to the reinforcing fiber substrate so that the fiber volume content of the reinforcing fiber substrate becomes a predetermined value, e.g., a value of 20% to 70% as mentioned above, there can be molded the fiber-reinforced resin intermediate material where the resin powder is melted on the outer surface of the reinforcing fiber substrate and the reinforcing fiber substrate has the void space opened on the outer surface.

Example 1

By preparing a fiber-reinforced resin intermediate material where a polyamide (PA6) resin powder was melted to a reinforcing fiber substrate composed of carbon fiber, laminating the material, performing heating and pressurization, and subsequently cooling it, a test of preparing a plate-like fiber-reinforced resin molded body was performed. The reinforcing fiber substrate was prepared using a woven fabric which resulted from plain weave of a carbon fiber bundle (three thousand fibers), each fiber having a diameter of 7 and had a fiber areal weight of 198 g/m². As the powdery resin attached to the reinforcing fiber substrate, a PA6 resin powder having an average particle size of 50 µm was used.

To the above carbon fiber substrate, the PA6 resin powder was electrostatically attached so as to achieve a fiber volume content of 60%. FIG. 5 shows an optical microscope photograph of a state of the surface immediately after the PA6 resin powder was electrostatically attached to the reinforcing fiber substrate. The surface of the reinforcing fiber substrate is still mottled but is observed as if powdery snow is spread thereon. After the PA6 resin powder was attached, the PA6 resin powder was promptly melted to fix it to the reinforcing fiber substrate using an IR heater, thereby preparing the fiber-reinforced resin intermediate material. On the surface of the prepared fiber-reinforced resin intermediate material, the PA6 resin powder was melted to the surface of the carbon fiber bundle in a state of having an uneven outer surface derived from the shape, size, or attached state of the powder, and the reinforcing fiber substrate had a void space opened on the outer surface resulting from the PA6 resin. The thickness of the prepared fiber-reinforced resin intermediate material was 250 μm.

Ten sheets of the above fiber-reinforced resin intermediate material were laminated in a mold heated to 260° C. and, while maintaining the temperature, the whole was pressurized at 3 MPa. The pressurization time was 70 seconds. Then, the mold was cooled and the molded fiber-reinforced resin molded body was taken out. By impregnating the reinforcing fiber substrate with the resin melted to the fiber-reinforced resin intermediate material through the above heating and pressurization, the molded fiber-reinforced resin molded body had a void ratio of 0.5% or less. Incidentally, the fiber volume content Vf can be, for example, determined according to JIS K 7075.

Example 2

A test for determining a minimum radius of curvature was conducted by performing a pure bending test of the fiber-reinforced resin intermediate material. The minimum radius of curvature means a radius of curvature at the time of fracture/breakage when the fiber-reinforced resin intermediate material is bent at room temperature. The pure bending test was performed in accordance with the pure bending test method described in the research on Dynamic Properties of Triaxial Woven Fabric Composite Materials (author: Keishiro Yoshida, http://repository.dl.itc.u-tokyo.ac.jp/dspace/handle/2261/42889). Fiber-reinforced resin intermediate materials were prepared by electrostatically attaching a PA6 resin powder to a plain-weave woven fabric of opened carbon fiber or unopened carbon fiber and melting the powder to the outer surface (Inventive Examples 1 and 2). As Comparative Example, a similar pure bending test was performed on one prepared by sticking a film-like PA6 resin to a plain-weave woven fabric of unopened carbon fiber and impregnating it with the PA6 resin through heating and pressurization. As the PA6 resin powder, the same one as in Example 1 was used.

Table 1 shows results of the pure bending tests. In Table 1, the fiber volume contents of Inventive Examples 1 and 2 indicate fiber volume contents when it is assumed that the fiber-reinforced resin intermediate materials are laminated in a predetermined mold and fiber-reinforced resin molded bodies having a predetermined shape are obtained through heating and pressurization. As shown in Table 1, the minimum bending radius of the fiber-reinforced resin intermediate material according to the present invention is small, it is not fractured/broken even in the case of the radius of curvature R2, i.e., the case where the radius of curvature R is 2 mm, and it is shown that the fiber-reinforced resin intermediate material is excellent in flexibility. On the other hand, the minimum bending radius of the fiber-reinforced resin intermediate material of Comparative Example is large, it is fractured/broken even in the case of the radius of curvature R20, i.e., the case where the radius of curvature R is 20 mm, and it is understood that the fiber-reinforced resin intermediate material is poor in flexibility.

TABLE 1

| | | Reinforcing fiber substrate | | |
| --- | --- | --- | --- | --- |
| | Radius of curvature R in bending test mm | Fiber-opening | Fiber volume content Vf % | Thickness μm |
| Inventive Example 1 | No problem at R2 | Yes | 50 | 200 |
| Inventive Example 2 | No problem at R2 | No | 50 | 300 |
| Comparative Example | Cracking and breakage at R20 | Yes | 50 | 250 |

While the invention has been described in detail and with reference to specific embodiments thereof, it will be apparent to one skilled in the art that various changes and modifications can be made therein without departing from the spirit and scope thereof. The present application is based on Japanese Patent Application No. 2016-082520 filed on Apr. 15, 2016, and the contents thereof are incorporated herein by reference.

REFERENCE SIGNS LIST

10: reinforcing fiber substrate
11: reinforcing fiber
20: resin powder

The invention claimed is:

1. A fiber-reinforced resin intermediate material comprising:
   a reinforcing fiber substrate including a plurality of reinforcing fibers; and
   a resin powder melted so as to adhere to an outer surface of the reinforcing fiber substrate,
      wherein the fiber-reinforced resin intermediate material has an uneven outer shape such that distal radial ends thereof protrude at different heights, and
      wherein an outer surface of the fiber-reinforced resin intermediate material includes open void spaces where the resin powder is not adhered to the reinforcing fiber substrate.

2. The fiber-reinforced resin intermediate material according to claim 1, wherein the resin powder has an average particle size of 1 to 500 μm.

3. The fiber-reinforced resin intermediate material according to claim 1, wherein the different heights are ½ or more as large as an average particle size of the resin powder.

4. The fiber-reinforced resin intermediate material according to claim 1, wherein each reinforcing fiber of the plurality of reinforcing fibers is composed of carbon fiber and has a fiber areal weight of 20 to 1,000 g/m$^2$.

5. A fiber-reinforced resin intermediate material comprising:
   a reinforcing fiber substrate including carbon fibers; and
   a resin powder melted so as to adhere to an outer surface of the reinforcing fiber substrate,
      wherein an outer surface of the fiber-reinforced resin intermediate material includes open void spaces where the resin powder is not adhered to the reinforcing fiber substrate,
      wherein the minimum radius of curvature of the fiber-reinforced resin intermediate material, which is a radius of curvature at the time of fracture when the fiber-reinforced resin intermediate material is bent at room temperature, is within 20 times as large as the thickness thereof.

6. A fiber-reinforced resin intermediate material comprising:
a reinforcing fiber substrate including a plurality of reinforcing fibers; and
a resin powder melted so as to adhere to an outer surface of the reinforcing fiber substrate,
wherein the resin powder does not penetrate into the inside of the reinforcing fiber substrate, and
wherein the fiber-reinforced resin intermediate material has an uneven outer shape such that distal radial ends thereof protrude at different heights.

7. The fiber-reinforced resin intermediate material according to claim 1, wherein the resin powder adheres to the reinforcing fiber substrate via electrostatic adhesion.

8. The fiber-reinforced resin intermediate material according to claim 7, wherein the average particle size of the resin powder is ⅕ to 30 times as large as the outer diameter of each of the plurality of reinforcing fibers.

9. A fiber-reinforced resin molded body, which is molded by laminating, heating, and pressurizing the fiber-reinforced resin intermediate material according to claim 1.

10. The fiber-reinforced resin molded body according to claim 9, wherein the fiber volume content is 15 to 70% and the void ratio is 1.5% or less.

11. A method for manufacturing a fiber-reinforced resin intermediate material formed by melting a resin powder so as to adhere to an outer surface of a reinforcing fiber substrate, such that the fiber-reinforced resin intermediate material includes open void spaces opened on an outer surface of the reinforcing fiber substrate where the resin powder is not adhered,
wherein the resin powder has a predetermined average particle size and is attached to the reinforcing fiber substrate so that the fiber volume content of the reinforcing fiber substrate becomes a predetermined value, based on the outer diameter of a reinforcing fiber that forms the reinforcing fiber substrate and the bulk density of the reinforcing fiber substrate, thereby molding the fiber-reinforced resin intermediate material, and
wherein the fiber-reinforced resin intermediate material has an uneven outer shape such that distal radial ends thereof protrude at different heights.

12. The fiber-reinforced resin intermediate material according to claim 5, wherein the resin powder adheres to the reinforcing fiber substrate via electrostatic adhesion.

13. The fiber-reinforced resin intermediate material according to claim 12, wherein the resin powder has an average particle size of ⅕ to 30 times as large as the outer diameter of the carbon fibers.

14. A fiber-reinforced resin molded body, which is molded by laminating, heating, and pressurizing the fiber-reinforced resin intermediate material according to claim 5.

15. The fiber-reinforced resin molded body according to claim 14, wherein the fiber volume content is 15 to 70% and the void ratio is 1.5% or less.

16. The fiber-reinforced resin intermediate material according to claim 6, wherein the resin powder adheres to the reinforcing fiber substrate via electrostatic adhesion.

17. The fiber-reinforced resin intermediate material according to claim 16, wherein the resin powder has an average particle size of ⅕ to 30 times as large as the outer diameter of the plurality of reinforcing fibers of the reinforcing fiber substrate.

18. A fiber-reinforced resin molded body, which is molded by laminating, heating, and pressurizing the fiber-reinforced resin intermediate material according to claim 6.

19. The fiber-reinforced resin molded body according to claim 18, wherein the fiber volume content is 15 to 70% and the void ratio is 1.5% or less.

* * * * *